US011964873B2

(12) United States Patent
Lynch

(10) Patent No.: US 11,964,873 B2
(45) Date of Patent: Apr. 23, 2024

(54) METHODS FOR PRODUCING HOLLOW CERAMIC SPHERES

(71) Applicant: Plassein Technologies Ltd. LLC, Las Vegas, NV (US)

(72) Inventor: David Charles Lynch, Kingsport, TN (US)

(73) Assignee: Plassein Technologies Ltd LLC, Las Vegas, NV (US)

( * ) Notice: Subject to any disclaimer, the term of this patent is extended or adjusted under 35 U.S.C. 154(b) by 273 days.

(21) Appl. No.: 17/002,645

(22) Filed: Aug. 25, 2020

(65) Prior Publication Data

US 2021/0078866 A1 Mar. 18, 2021

Related U.S. Application Data

(60) Provisional application No. 62/892,619, filed on Aug. 28, 2019.

(51) Int. Cl.
*C01B 33/12* (2006.01)
*C01B 33/26* (2006.01)
(Continued)

(52) U.S. Cl.
CPC .......... *C01B 33/124* (2013.01); *C01B 33/26* (2013.01); *C01F 7/42* (2013.01); *C04B 14/041* (2013.01);
(Continued)

(58) Field of Classification Search
CPC ... C01B 33/26; C04B 14/041; C01P 2004/34; C01P 2004/61; B22D 19/00
See application file for complete search history.

(56) References Cited

U.S. PATENT DOCUMENTS 5,632,326 A * 5/1997 Gough .................... B22C 9/084
164/359
6,840,994 B2 * 1/2005 Krowl ..................... C04B 28/18
106/796
(Continued)

FOREIGN PATENT DOCUMENTS

HU 0303607 A2 * 3/2004 ............... B22D 1/00

OTHER PUBLICATIONS

PCT Application No. PCT/US20/48476, International Search Report and Written Opinion dated Jan. 26, 2021.

*Primary Examiner* — Jun Li
(74) *Attorney, Agent, or Firm* — Larry E. Henneman, Jr.; Henneman & Associates, PLC

(57) ABSTRACT

A method is presented for producing hollow microspheres of metal oxides (HMOMS) and/or hollow metal silicates microspheres (HMSMS) in a transforming solution. The transforming solution contains an atom M, or an M-ion, or a radical containing M. M in the transforming solution has the thermodynamic ability to replace silicon atoms in hollow silica microspheres (HSMS) and/or hollow glass microspheres (HGMS). The maximum temperature for transformation is set by the chemical physical properties of the transforming solution, and the viscosity of the silica in the walls of the HSMS and/or the glass in the walls of the HGMS. Viscosity, of enough magnitude, helps retain the desired shape of the hollow sphere as it is transformed to HMOMS and/or HMSMS. Non-spherical shapes can be produced by increasing the transformation temperature whereby the viscosity of the walls of the HSMS and/or the HGMS is reduced. Transformation can take place at a single temperature or at several temperatures, each temperature for a separate hold time.
Methods are presented for:
(Continued)

1. production of micro composite castings and continuous production of sheets of micro composites, both consisting of hollow spheres in a matrix,
2. harvesting of HMOMS and HMSMS, and
3. specialty castings for anisotropic properties using 3-dimensional printing.

4 Claims, 4 Drawing Sheets

(51) Int. Cl.
  *C01F 7/42* (2022.01)
  *C04B 14/04* (2006.01)
  *B22D 19/00* (2006.01)
(52) U.S. Cl.
  CPC .......... *B22D 19/00* (2013.01); *C01P 2004/34* (2013.01); *C01P 2004/61* (2013.01)

(56) References Cited

U.S. PATENT DOCUMENTS

| | | |
|---|---|---|
| 7,651,563 B2 * | 1/2010 | Datta .................... C04B 18/023 |
| | | 106/676 |
| 8,815,408 B1 | 8/2014 | Cochran et al. |
| 2004/0100004 A1 * | 5/2004 | Willoughby ........... B22D 1/005 |
| | | 266/286 |
| 2005/0158390 A1 | 7/2005 | Rana et al. |
| 2009/0155371 A1 | 6/2009 | Sojka et al. |
| 2016/0250612 A1 | 9/2016 | Oldenburg et al. |

* cited by examiner

METHODS FOR PRODUCING HOLLOW CERAMIC SPHERES

RELATED APPLICATIONS

This application claims the benefit of U.S. Provisional Patent Application No. 62/892,619, filed on Aug. 28, 2019 by the same inventor, which is incorporated herein by reference in its entirety.

BACKGROUND

Field of the Invention

The present invention relates to the production of hollow ceramic spheres and their use in composites.

Description of Related Art

Hollow spheres have largely found use as a filler material that reduces density of organics. Organic and glass hollow spheres have found use in polymeric compounds as early as the mid-1960s. Initially, glass microspheres weren't strong enough to survive the high shear forces and high pressures involved in plastics compounding and injection molding. 3M introduced a glass microsphere in the late 80s with enough strength for use as a filler in many high-shear processes.

Cenospheres have also found use in organic compounds. They are hollow glass microspheres that are a by-product of coal burning power plants. The composition of a cenosphere is a function of the composition of the coal burned. Cenospheres typically contain more than 50 weight percent (wt %) silica ($SiO_2$), 22 to 34 wt % alumina ($Al_2O_3$), 3 to 5 wt % basic oxides (consisting of CaO, MgO, $K_2O$, $TiO_2$, and iron oxides), and small concentrations of other heavy metals. The viscosity and composition of the glass that forms the wall of a cenosphere limits their use at elevated temperatures. At high temperatures their low viscosity will lead to their collapse, and the presence of heavy metals poses both environmental and physical problems. The transfer of impurity atoms in cenospheres to a matrix material can impact its properties such as strength and toughness.

Definitions

Fixing powder—a powder applied to HSMS, or HMOMS, or HMSMS and then partially fused to fix the hollow spheres in place HAMS—hollow alumina microspheres, their wall structure can be crystalline or amorphous HGMS—hollow glass microsphere HMMS—hollow mullite microsphere, their wall structure can be crystalline or amorphous HMOMS—hollow metal oxide microsphere, their wall structure can be crystalline or amorphous HMSMS—hollow metal silicate microsphere, their wall structure can be crystalline or amorphous Hold time—time at a transformation temperature HSMS—hollow silica microsphere, their wall structure can be crystalline or amorphous M—is the representation of any atom found in transforming solution or transforming powder that has the thermodynamic potential to replace silicon atoms in silica. The silica can be crystalline or fused silica, and both can contain other molecular species.

Macrocomposite—composites consisting of layers of different material producing anisotropic properties within the composite Maximum transforming temperature—The maximum temperature for transformation is set by the chemical and physical properties of the transforming solution, and the viscosity of the silica in the walls of the HSMS and/or the glass in the walls of the HGMS. Viscosity, of enough magnitude, helps retain the desired shape of the hollow sphere as it is transformed to HMOMS and/or HMSMS. Non-spherical shapes can be produced by increasing the transformation temperature whereby the viscosity of the walls of the HSMS and/or the HGMS is reduced Microcomposite—uniform distribution of the hollow spheres in a matrix producing isotropic properties throughout the composite MO—represents oxides of M. MO does not necessarily reflect the stoichiometry of the oxide MS—represents any silicate containing M. MS does not necessarily reflect the stoichiometry of the silicate Transforming and Transformation—Process of converting HSMS and/or HGMS to HMOMS and/or HMSMS Transforming solution—any metal, metal alloy, ceramic, organic, or gas phase containing M. The transforming solution can be single or multiphase. The metal, metal alloy, ceramic, and organic transforming solution can be solid or liquid or combination of both.

Transformation temperature—temperature or temperatures over which transforming occurs Transforming powder—any metal, metal alloy, ceramic powder containing M. The transforming powder can be single or multiphase.

SUMMARY OF THE DISCLOSURE

Three-dimensional printing of metals, ceramics, and organics provides opportunity for producing designer material components with non-isotropic properties; property variations specifically designed to meet specific needs. Hollow spheres can play a significant role in varying density, thermal conductivity, electrical conductivity, resistance to corrosion, crush resistance, tensile and yield strengths, and sound dissipation to name but a few properties.

Example methods are disclosed for producing hollow ceramic microspheres from hollow spheres with walls consisting of silica or glass (containing silica) using a transforming solution or transformation powder that contains a highly reactive atom, M, that replaces silicon atoms in silica or silica containing glass. Example methods for harvesting hollow ceramic microspheres are also disclosed, as well as example methods for producing microcomposite casting and sheet material containing hollow spheres in a matrix.

One example process employs hollow silica microspheres (HSMS) and hollow glass microspheres (HGMS) to produce hollow metal oxide microspheres (HMOMS) and hollow metal silicate microspheres (HMSMS) in a transforming solution or transforming powder that contains an atom (M). In the transforming solution, (M) has the thermodynamic ability to replace the Si atoms in silica found in HSMS and/or HGMS. The wall of HSMS can be either fused or crystalline silica. The silicon atoms in the HSMS or HGMS are replaced, either totally or partially, by (M) atoms. The maximum temperature for transformation is set by the chemical and physical properties of the transforming solution, and the viscosity of the wall of the HSMS and the wall of the HGMS. Too high a temperature can result in the collapse of the hollow sphere undergoing transformation.

The transforming process can be carried out by many processes that are variations of the different example methods presented herein. In example methods presented herein, it is assumed that the transforming solution and transforming powder is a reactive metal (M), and that HSMS are being transformed. These assumptions are not limiting and do not preclude other materials/compositions including, but not limited to: other possible transforming solutions consisting of metal alloys, ceramics, organics, and gases; that the hollow sphere being transformed is a HGMS; and/or other forms of (M), such as an ion or a radical. The assumptions are made to minimize confusion and present clear, but non-limiting, examples in this disclosure.

Example Methods

The methods presented are not sequential or considered to be all encompassing. There can be variations and alternative methods that rely on one or more of the basic principles presented herein.

In one example method, the HSMS can be converted to either HMOMS or HMSMS in molten metal, M. The temperature of the molten metal can be controlled to produce the desired product and the rate of production. The resulting spheres can be either harvested or cast with the metal. The replaced silicon atoms alloy with metal-M. Casting the spheres (HMOMS or HMSMS) with the metal alloy (consisting of the metal-M and silicon) produces a composite with a metal alloy matrix (the matrix can be one or more phases). The uniform distribution of the hollow spheres in the metal matrix is referred to as a microcomposite, whereas composites consisting of layers of different material are referred to as macrocomposites. Microcomposites have isotropic properties, unlike that of macrocomposites.

If the HMOMS or HMSMS are harvested, with some residual transformation solution, they can be cleaned by chemical and/or physical means to remove any excess material. The harvested spheres can be used to produce composite products or used in other processes.

In another example process, by selecting a temperature where reaction of molten metal-M with HSMS is slow, the hollow silica spheres can be cast with the metal to produce a solid micro-composite. That solid composite can undergo heat soaking to convert the HSMS to HMOMS or HMSMS. The rate of transition can be controlled by the temperature of the heat treatment. If the molten metal-M and HSMS are cooled to ambient temperature without further heat treatment, the transition can take longer to occur, up to centuries. Thus, it is possible to have a metal-HSMS microcomposite in a reactive material.

In another example process, by selecting a temperature where reaction of molten metal-M with HSMS is slow, the silica spheres can be cast with the metal to produce a solid microcomposite. Cooling the composite quickly prevents equilibrium conditions from being established in the solid composite. Reheating the M-HSMS microcomposite to a temperature above the eutectic temperature (the eutectic nearest to the pure metal, M, in the M-silicon binary system), but below the fusion temperature of M, a liquid-solid mush zone forms around the hollow spheres as the silicon atoms in the HSMS are replaced by M atoms. The thickness of the mush zone depends on the amount the temperature exceeds the eutectic temperature, and diffusion of the silicon atoms into the solid metal-M matrix. By cooling and heat soaking the composite below the eutectic temperature, a solid ring forms around the hollow sphere that consists of either metal (M) alloy rich in silicon (compared to the rest of the metal matrix in the composite), or metal (M) silicides.

In another example method, the HSMS can be converted to either HMOMS or HMSMS in metal transforming powders, M, during sintering. This approach has the advantage of being able to produce a microcomposite in metal, M, that has a fusion temperature greater than the maximum transforming temperature. The replaced silicon atoms alloy with metal-M through solid state diffusion.

In some or all of the example methods it is desirable to heat treat the microcomposite after solidification to reduce internal stresses on the hollow spheres.

It is desirable, but not essential, that metal oxide (MO) produced in the transformation process have a high melting temperature, and essential that MO be more thermodynamically stable than that of silica ($SiO_2$). The class of metals that meet the conditions stated above includes, but is not limited to, aluminum (Al), magnesium (Mg), calcium (Ca), uranium (U), and rare earth elements.

BRIEF DESCRIPTION OF THE DRAWINGS

The present invention is described with reference to the following drawings, wherein like reference numbers denote substantially similar elements.

DETAILED DESCRIPTION

Figure 1:
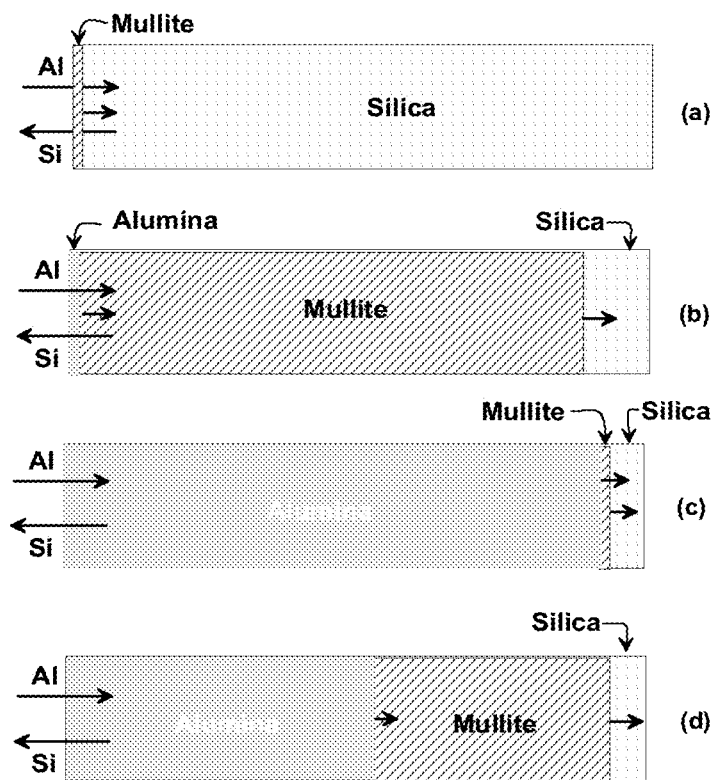
FIG. 1 illustrates the impact of kinetic rates on converting the silica wall to either or both mullite and alumina.

The following Examples I through VII focus on the use of aluminum as the transforming solution, transforming powder, and the reactive atom, M. This is done to provide specific examples and to improve clarity. Aluminum is only used as a representative of any of the chemical systems that can be used in the transformation process. Thus, the examples in I through VII are not limited to aluminum.

In combining molten aluminum with HSMS the hollow silica spheres are converted to either hollow alumina ($Al_2O_3$) microspheres (HAMS) or hollow mullite ($Al_6Si_2O_{13}$) microspheres (HMMS). In the examples involving aluminum, HAMS is the specific designation for the general category of HMOMS, and HMMS is the specific designation for the general category of HMSMS.

Example I, the Chemistry

HAMS and HMMS are produced in molten aluminum by including HSMS in the casting process. Aluminum replaces silicon in the silica. The mass of silica involved in the transformation process is such that the resulting aluminum alloy will typically have a silicon content of 3 to 15 weight percent but is not limited to that range. Higher concentrations of silicon in the metal alloy matrix can be produced by either beginning with an aluminum-silicon alloy instead of pure aluminum, or by using HSMS with thicker walls. The wall thickness of the HSMS will impact the wall thickness of both the HAMS and the HMMS.

A measure of the ability of aluminum to replace silicon in the silica wall of the HSMS is the standard state Gibbs' energy ($\Delta G°$) for the following reactions:

$$6Al(l)+6.5SiO_2(l)=Al_6Si_2O_{13}+4.5Si(l) \ \Delta G°=-723 \text{ kJ},$$
at 700° C. (1)

for mullite, and $$2.66Al(l)+Al_6Si_2O_{13}=4.33Al_2O_3+2Si(l) \quad \Delta G°=-304 \text{ kJ, at } 700° \text{ C.} \quad (2)$$

for alumina.

SiO$_2$(l) in the two chemical reactions is fused silica. Quartz (crystalline silica) can be substituted for fused silica, but the result will alter the values for $\Delta G°$. The viscosity of the fused silica is so large that it prevents the silica glass from being transformed to its equilibrium crystalline structure, even at highly elevated temperatures. The viscosity of the silica and the normal melting temperature of aluminum (660° C.) set the temperature range over which hollow spheres of mullite and alumina can be formed in molten aluminum.

Production of HAMS, depending on temperature, can involve two reactions occurring in series (reactions 1 and 2). Alternatively, it is possible for alumina to be formed directly without mullite as a transition phase at elevated temperatures. In the direct formation case, the reaction occurring is $$2Al(l)+1.5SiO_2(l)=Al_2O_3+1.5Si(l). \quad (3)$$

If the process of transforming HSMS to HAMS involves both reactions 1 and 2, the fused silica wall in a hollow silica microsphere reacts with molten aluminum (Al(l)) producing mullite that further reacts with the aluminum producing alumina. Both reactions produce elemental silicon (Si) that alloys with the molten aluminum, as represented by underlining of the element in reactions 1 and 2. The large negative values of $\Delta G°$ indicate both reactions are highly thermodynamically favorable as written. The equilibrium constants (k) for the reactions are:

$$k_1 = \exp\left(\frac{-\Delta G_1°}{RT}\right) = 2.68 \cdot 10^{38} = \frac{a_{Al_6Si_2O_{13}} a_{Si}^{4.5}}{a_{Al}^6 a_{SiO_2}^{6.5}} \gg a_{Si}^{4.5} \quad (4)$$

and $$k_2 = \exp\left(\frac{-\Delta G_2°}{RT}\right) = 2.12 \cdot 10^{16} = \frac{a_{Al_2O_3}^{4.33} a_{Si}^2}{a_{Al}^{2.66} a_{Al_6Si_2O_{13}}} \gg a_{Si}^2 \quad (5)$$

where $a_i$ represent the activity of component i. The values of the activity of the fused silica, mullite, and alumina, for the pure phases that are involved in the process for producing the hollow spheres, are 1. The value of the activity of the molten aluminum is approximately 1, having values ranging approximately from 0.85 to 0.97, again for the proposed process. Thus, the ratio of activities for the real values in equations 4 and 5 reduce to the activities of silicon raised to the powers associated with the stoichiometric value in reactions 1 and 2. Since the maximum value of the activity of Si is 1, and the value of 1 raised to any power is still 1, the only way reactions 1 and 2 can achieve equilibrium is for the resulting metal alloy to be nearly pure silicon, in which case the value of the activity of aluminum in the alloy would approach 0. That situation doesn't occur, because the fused silica is completely consumed before the activity of the aluminum drops below approximately 0.85. Thus, for the proposed process, the reactions are always thermodynamically favorable. With a thicker silica wall in the HSMS the activity of aluminum can be further reduced, as long its activity does not approach a value of 0.

The rate at which silica is converted to mullite, and mullite to alumina impacts whether the HSMS is transformed into HMMS or HAMS. The transformation of the silica wall of a HSMS to mullite, or alumina, or a combination of the two is dependent on reaction rates as presented in FIG. 1. Those rates depend on both chemical kinetics and transport phenomena.

FIG. 1 illustrates the impact of kinetic rates on converting the silica wall to either or both mullite and alumina. In FIG. 1(a), Al replaces Si and a thin layer of mullite is formed. In FIG. 1(b), the rate of converting silica to mullite is very fast compared to the rate of converting mullite to alumina. The result is that HSMS are converted to MIMS with a thin exterior coating of alumina. In FIG. 1(c), rates of transformation of FIG. 1(b) are reversed, with the ultimate result being HSMS converted to HAMS. In FIG. 1(d), the conversion rates are similar leading to a situation where the walls of the HSMS are composed of both mullite and alumina.

Hollow spheres having a wall consisting of significant proportions of both mullite and alumina, as presented in FIG. 1(d), can be formed, but may not be desirable, because the difference in thermal expansion coefficients for the two materials upon heating and cooling will produce internal stresses that will possibly rupture the wall of the hollow sphere.

By controlling both the temperature at which the silica wall is converted, and the duration of time held at that temperature, mullite or alumina can selectively be the final product. The choice of either ceramic will depend on final use, and in what form. The hollow spheres can remain in an aluminum alloy matrix or be recovered by physical and chemical means.

Example II, Casting Aluminum with HSMS

Casting of HSMS with molten aluminum can produce HMMS or HAMS as explained in Example I. An example of the production of hollow spheres and the casting of a composite is presented in FIG. 2. Hollow microspheres 202 of fused silica (HSMS) are added to the mold 204 through the opening for the porous plug 206. Once the spheres 202 are in place the porous gas plug 206 is inserted and locked in place. The spheres 202 are retained in the mold by a low melting alloy plug 208 placed at the bottom of the casting to ensure that the buoyancy of the hollow spheres keeps them in place once the molten metal enters the mold. The composition of plug 208 is chosen/configured to complement the final desired composition of the metal matrix. Molten metal entering the mold fuses the consumable plug, and the molten metal enters the interior chamber of mold 204 containing the HSMS. If the rate of transformation of the HSMS to either HMMS or HAMS is slow, the mold can be heated for an extended period to achieve the conversion. The heating element (or process for heating) is not shown in FIG. 2. In casting, gas escapes mold 204 through porous plug 206. The diameters of the pores in plug 206 are substantially smaller than the diameter of the HSMS. Porous plug 206 can be replaced by a non-porous plug if gas retention is not a problem. Mold 204 is heated as necessary to produce the desired hollow spheres of mullite or alumina, then cooled before recovery of the casting.

This is only one example method for producing a microcomposite casting. While variations are possible, this example method is intended only to illustrate the advantage of keeping the hollow spheres in place to produce the desired casting.

Retaining the HMMS or the HAMS in the aluminum alloy, as in a casting, produces a lightweight composite. The bulk density of the composite being about 0.88 g/cm$^3$ as compared to 2.7 g/cm$^3$ for elemental aluminum and its alloys. The density of the composite can be adjusted by varying the diameter and wall thickness of the hollow spheres. A significant decrease in the bulk density of the composite can be achieved by using two, or more, sizes of hollow spheres, such that the smaller hollow spheres occupy the interstices created by the larger spheres.

Aluminum is prized for its light weight and resistance to corrosion, and as a result of those properties it is used as an architectural material where weight issues are a significant issue. Therefore, it is expected that the example composites described herein, and variations thereof, will provide similar significant advantages in architectural materials.

Silumin is a group of lightweight, high-strength aluminum alloys with silicon content between 3 to 25 weight percent. The alloy formed upon converting HSMS to either HAMS or HMMS in aluminum metal produces an alloy with approximately 3 to 15 weight percent silicon. Those numbers can be adjusted by either using HSMS with increased or decreased wall thickness, or by using a Silumin alloy instead of aluminum to produce the hollow spheres.

Casting is the primary use of aluminum-silicon alloys, but they can also be utilized in rapid solidification processes. Silumin has a high resistance to corrosion, making it useful in humid environments. Silumin, with a silicon content of 16 to 19 weight percent, can be used in high-wear applications such as pistons, and cylinder liners. The alloy is etched after casting, exposing hard, wear-resistant silicon precipitates. The rest of the surface becomes slightly porous as a result of aluminum atoms removed during the etching process. That porosity retains oil, lubricating pistons. Abrading the surface of a Silumin alloy with hollow spheres opens the hollow spheres at the surface, providing additional reservoirs for oil.

Example III, Producing Hollow Spheres as a Commodity

Figure 3:
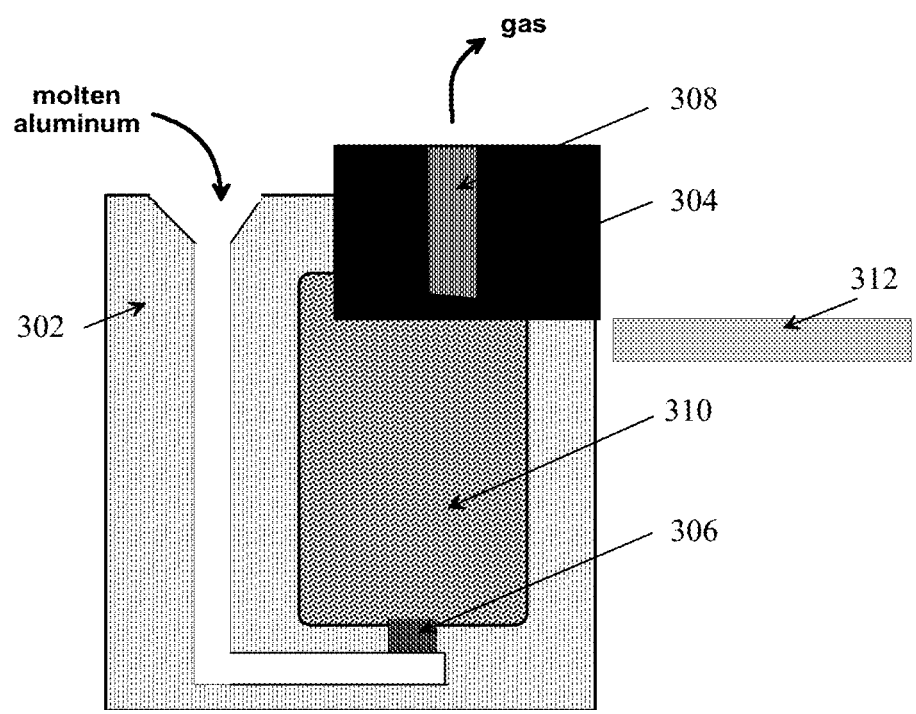
FIG. 3 shows a reaction chamber for producing hollow spheres.

The converted hollow spheres in Example II, whether their walls are mullite or alumina, will be buoyant. In FIG. 3, a chamber 302 has a removable lid 304. Again, there are both a consumable plug 306 and a porous gas plug 308. Again, porous plug 308 can be replaced by a non-porous plug if gas retention is not a problem. Chamber 302 can more accurately be viewed as a reactor with a reaction chamber that is controllably heated as necessary during the production of HMMS or HAMS. The method for heating is not shown in FIG. 3. The reactor is packed with HSMS 310 removable lid 304 placed on top of the reactor. Molten aluminum is added, as shown in FIG. 3. Consumable plug 306 fuses and aluminum enters the reactor vessel. Upon converting the hollow spheres 310 of fused silica to either hollow spheres of mullite or alumina, lid 304 is removed, and the processed spheres are harvested with a rake, paddle, or similar means. Additional molten aluminum can be added to raise the level of aluminum in the reactor to increase the mass of processed spheres that can be harvested. The hollow spheres are collected in a tray 312 along with some of the molten metal. The collected mass is cooled before undergoing chemical and/or physical treatment to remove the aluminum metal. It is possible to produce HAMS and HMMS as separate products.

This is only one example method for producing HMOMS or HMSMS as separate commodities. Other variations are possible. While variations are possible, this example is intended only to emphasize the basic process, and to illustrate one example way of keeping the hollow spheres in place while they undergo transformation, and to illustrate the use of the buoyancy of the hollow spheres in their recovery.

The molten metal remaining, after harvesting the hollow spheres, can be cast as billets of Silumin and sold or used in the production of other products such as automotive wheels.

Example IV, Producing Composite Sheet Metal with Hollow Spheres

Figure 2:
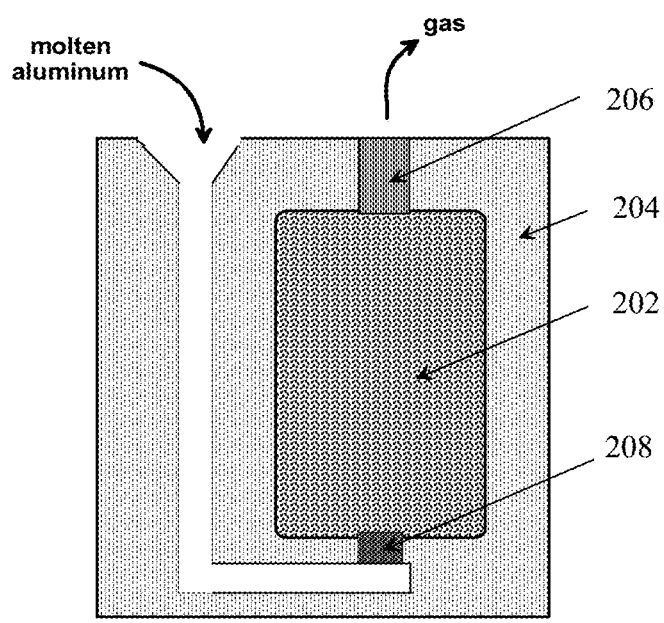
FIG. 2 shows a mold for producing a casting including hollow spheres.
Figure 4:
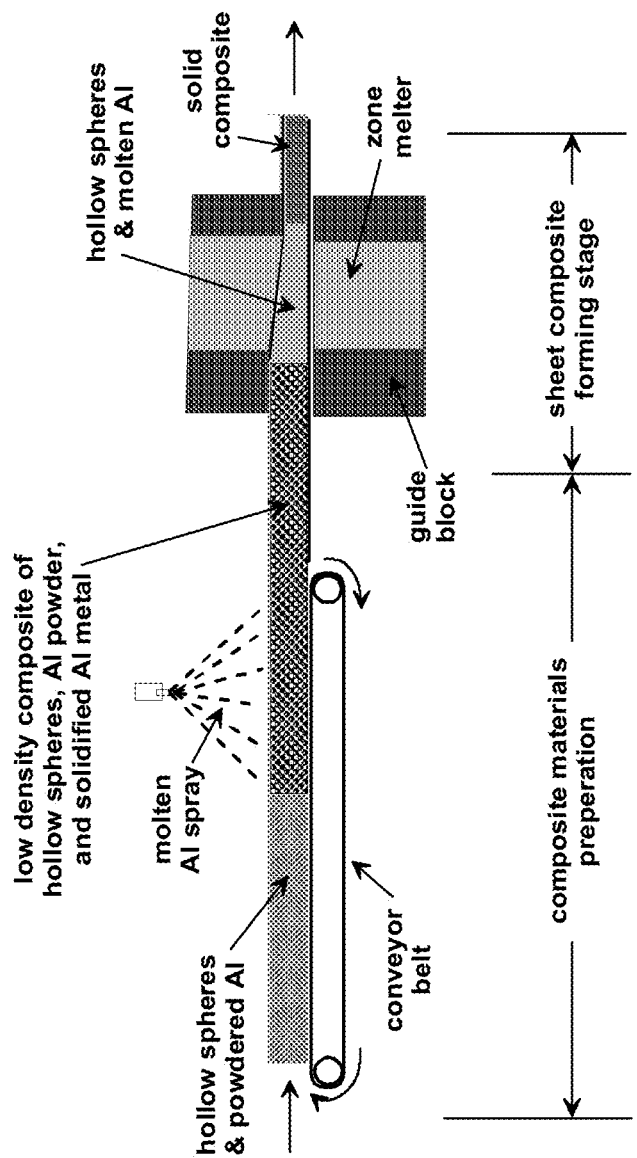
FIG. 4 illustrates an example continuous process for producing an aluminum composite with hollow spheres.

Casting and the production of HMMS and HAMS, as presented in FIGS. 2 and 3, are examples of batch processes. FIG. 4 illustrates an example continuous process for producing an aluminum composite with hollow spheres. The order in which the described steps occur may be altered in different example methods.

The process for producing sheet metal composite is divided into two sections: composite material preparation and the sheet composite forming stage. In the former stage HAMS or HMMS (or both) are placed on a conveyor belt and dusted with a light layer of aluminum powder (fixing powder). A fine spray of molten aluminum is applied to the hollow spheres and the aluminum powder to partially fuse the powder and coat the spheres. This is done to lock the spheres in place. This process is repeated until the thickness of the material will produce the desired sheet metal composite in the forming stage.

HSMS and/or HGMS can be substituted for HAMS and HMMS in the preparation stage. In that case, the fixing powder is a transforming powder, and the sprayed aluminum is a transforming solution.

In the forming stage, the layered material passes into a guide block that contains a zone-melter. The gap between the material entering and the guide block is eliminated as the material enters the zone-melter. The zone-melter fuses both the aluminum transforming powder and the solidified aluminum transforming solution, and compresses the layered material to the desired thickness for the sheet composite. The reduction in thickness is accomplished by eliminating the pore volume in the material entering the guide block, and with minimum destruction of the hollow spheres. The guide block in contact with the material entering and leaving seals the melt zone, keeping the hollow spheres in close-pack structure, thereby assuring uniformity in both vertical and horizontal directions.

In another example process, hollow spheres can be deposited in rows forming sheets. The hollow spheres can be heated as deposited, or in rows, or in sheets, with heating impacting only neighboring hollow spheres. Heating can be restricted to one or two layers such that the hollow spheres deposited on previous passes are not significantly altered and such that the newly deposited hollow spheres can bond to the walls of the spheres below, to the preceding row of spheres in the same layer, and to the hollow spheres to their right and left. This approach allows for three-dimensional bonding between the hollow spheres, providing cohesion to each layer of hollow spheres and overall strength to the multilayered product. An entire layer of hollow spheres can be processed at one time.

This approach produces a sheet consisting of multiple layers of hollow spheres in a near close-pack structure with approximately 26 volume percent interconnected voids. This sheet material can be infused with molten metal, metal powders, gypsum slurry, polymers, and ceramic slip to produce microcomposites with metals, drywall, plastics, and ceramics. This list is not intended to limit potential uses, but only to identify a few example uses for the hollow spheres.

These are just two examples of methods for continuous processes for producing microcomposite sheet metal. Other variations are possible. While variations are possible, these examples are intended to the advantage of keeping the hollow spheres in the desired location while producing the sheet metal.

Example V, Casting HSMS in Aluminum with Solid-State Transformation

Transformation of HSMS to either HAMS or HMMS can take place in either solid or molten aluminum. It is possible with rapid casting and solidification to produce a solid composite of HSMS in aluminum or an aluminum alloy. In doing so, there is minimal transformation of the HSMS to either HMMS or HAMS (as represented in FIG. 1(a)). This is accomplished by quickly cooling the composite to a temperature below the eutectic temperature in the aluminum-silicon binary system. That composite can undergo heat soaking to convert the HSMS to HMMS or HAMS. The rate of transition can be controlled by the temperature and duration of the heat treatment. If the molten metal and HSMS are cooled to ambient temperature, the transition is slowed and can take centuries to occur. It is, thus, possible to have HSMS in composite with a reactive metal.

In the example process, the aluminum-silicon system has only one eutectic point. In more complex systems the composite is cooled to a temperature below the eutectic temperature of the eutectic point with a composition closest to the pure metal or metal alloy.

Example VI, Casting HSMS in Aluminum with Mushy Zone Transformation

The solidified composite in Example V can be reheated to a temperature above the eutectic temperature in the aluminum-silicon binary system, but below the fusion temperature of pure aluminum. By heat soaking the micro-composite at the temperature indicated, a liquid-solid mush zone forms around the HSMS as the silicon atoms are replaced by aluminum atoms. The thickness of the mush zone depends on the extent of the temperature above the eutectic temperature, and diffusion of the silicon atoms into the solid metal matrix. By cooling and heat soaking the composite below the eutectic temperature, a solid ring forms around the hollow sphere that consists of an aluminum alloy rich in silicon (compared to the rest of the metal matrix in the composite). In more complex systems, a silicide phase may form between the metal and the hollow spheres (aluminum does not form a silicide; other reactive metals do form silicides).

Example VII, 3-Dimensional Printing with Hollow Spheres

HSMS, HGMS, HAMS, and MIMS can be used in 3D printing of metals, ceramics, and organics to produce desired properties in specific locations. The process includes maintaining the hollow spheres in the desired location(s). One such approach is presented in Example IV where hollow spheres of mullite or alumina are placed in their desired location, then dusted with a light layer of aluminum transforming or fixing powder, and subjected to a fine spray of molten aluminum to lock the hollow spheres in place. In contrast, a process of Example VII produces a macro composite on a smaller, or even on a micro scale. The order of the steps can be altered depending on the particular application. The example process presented is just one of many possible variations.

Example VIII, Composite Billets with Hollow Spheres Formed Using Powders

Example VIII applies to chemical systems with very high melting point temperatures, unlike that for aluminum, for the transforming solution, temperatures at which the viscosity of the walls forming the HSMS and HGMS would be so low that the hollow spheres could collapse. Transforming the HSMS or HGMS to HMSMS and HMOMS is accomplished using powder metallurgy techniques. The example is presented in generic terms with respect to the transforming powder.

HSMS, or HGMS, or HMOMS, or HMSMS, or any combination of hollow spheres is placed in a mold or form that restrains the movement of the spheres. A form like the mold in Example II is one example of such a mold or form. A small particle size transformation powder, or fixing powder, is added to the form. The powder fills the voids between the hollow spheres, while keeping the spheres in their original location. The mix of hollow spheres and powder can be pressed, but crushing of the hollow spheres may occur if too much force is used. The form can be sealed under vacuum or an inert gas. Before the form is sealed it is recommended, but not required, to minimizing any unoccupied volume. If the form is sealed under an inert gas, or gas is generated during processing, a means for gas escape during heating is desirable. The sealed form is heated to an elevated temperature to initiate both sintering of the powder and chemical reaction between the transformation powder and the HSMS or the HGMS to produce HMSMS or HMOMS. The transforming temperature is limited by the viscosity of the walls of the hollow spheres. If the temperature is too high, the hollow spheres may collapse. The form is held at the transforming temperature until the desired degree of sintering and transformation has been completed. The sintering and transformation process can involve more than one temperature and hold time. Transformation of the HSMS or HGMS occurs by chemical reaction involving the transport of species by either solid-state diffusion or diffusion of species through the gas phase surrounding the hollow spheres and the transforming powder. After achieving the desired results, the form is cooled, and the sintered billet recovered.

Post-Solidification Heat Treatment:

In Examples II, and IV-VII it is desirable, but not required, to heat treat the micro-composite after solidification to reduce internal stresses on the hollow spheres.

Oxygen Solubility—Oxygen solubility may impact the processes presented in the examples. The compositional extent of oxygen solubility is expected to be small in transforming solutions that produce highly thermodynamic stable oxides. Until maximum oxygen solubility of the transforming solution is achieved the silica in the wall of the HSMS or HGMS will be dissolved in the transforming solution by the reaction $$SiO_2(l) \rightarrow Si + 2O. \tag{6}$$

Once the metal is saturated with dissolved oxygen (O), reaction 6 stops and the exchange of reactive atoms, M, for silicon atoms in the wall of the HSMS or HGMS starts, examples of which are presented in reactions 1 through 3.

The impact of oxygen solubility, whether small or large, in Examples II and III can be minimized or eliminated by including a channel between the consumable plug and the casting volume holding the HSMS (see FIG. 2) or the reaction chamber holding the HSMS (see FIG. 3). HSMS placed in the channel can serve as both sacrificial spheres to saturate the molten metal with oxygen, and as replacement spheres for any spheres consumed in the casting or reaction chamber.

In Example IV any loss of HSMS or HGMS in producing a sheet metal composite can be offset by accounting for that loss in the amount of material entering the zone melter in FIG. 4. In Example VIII a small amount of powder containing oxygen can be added to the transforming (or fixing) powder to offset any decomposition of the hollow spheres.

Alternative approaches to the issue of oxygen solubility can be solved by other means such as pretreating the transformation fluid with oxygen or an oxygen containing compound.

Exemplary Methods/Processes/Materials

1. A physico-chemical process for forming hollow metal oxide microspheres (HMOMS) and/or hollow metal silicate microspheres (HMSMS) can involve:
    a. Reaction of a transformation solution with hollow silica microspheres (HSMS).
        i. The transformation solution can be a metal, a metal alloy, ceramic, organic, or a gas, or any combination.
            1. Metal, metal alloy, ceramic, and organic transformation solutions can be solid or liquid.
        ii. The transformation solution can contain atoms (M) that in the transformation solution can, thermodynamically, replace silicon atoms in silica ($SiO_2$) by chemical reaction.
            1. The reactive atom can be a metal, or metalloid, or combination of the two.
            2. The reactive atom, M, can be neutral, an ion, or a constituent of a radical.
    b. The walls of the HSMS in Exemplary Method 1.a can be either crystalline quartz or fused silica.
    c. The maximum temperature at which HMOMS and/or HMSMS are formed can be dictated by:
        i. The viscosity of the hollow silica microspheres (HSMS) that maintains the desired shape of the spheres that are to be transformed.
        ii. The chemistry and physical properties of the transformation solution.
        iii. The rate of transformation.
    d. The class of metals that meet the conditions stated in Exemplary Method 1.a.ii includes, but is not limited to, aluminum (Al), magnesium (Mg), calcium (Ca), uranium (U), and rare earth elements.
2. A physico-chemical process for forming hollow metal oxide microspheres (HMOMS) and/or hollow metal silicate microspheres (HMSMS) involves:
    a. Adding transforming solution to the mold/casting.
    b. Reaction of a transformation solution with hollow glass microspheres (HGMS).
        i. The transformation solution can be a metal, metal alloy, ceramic, organic, or a gas, or any combination.
            1. Metal, metal alloy, ceramic, and organic transformation solutions can be solid or liquid.
        ii. The transformation solution can contain atoms (M) that in the transformation solution can, thermodynamically, replace silicon atoms in silica ($SiO_2$) in the HGMS by chemical reaction.
            1. The reactive atom can be a metal, or metalloids, or combination of the two.
            2. The reactive atom, M, can be neutral, an ion, or a constituent of a radical.
    c. The maximum temperature at which HMOMS and/or HMSMS are formed is based on:
        i. The viscosity of the hollow glass microspheres (HGMS) that maintains the desired shape of the spheres that are to be transformed.
        ii. The chemistry and physical properties of the transformation solution.
        iii. The rate of transformation.
    d. The class of metals that meet the conditions stated in Exemplary Method 2.a.ii includes, but is not limited to, aluminum (Al), magnesium (Mg), calcium (Ca), uranium (U), and rare earth elements.
3. A method for producing castings with HMOMS or HMSMS involves:
    a. Adding transforming solution to the mold/casting.
    b. A mold that contains either HSMS or HGMS.
        i. HSMS or HGMS in the mold are converted to HMOMS or HMSMS during the casting process as per the physico-chemical processes presented in Exemplary Methods 1 and 2.
    c. In the transformation process in Exemplary Methods 3.b.i a method/device (consumable plug or similar device) can be used to keep the hollow spheres in place during casting.
    d. In the transformation process in Exemplary Methods 3.b.i a method/device (porous plug or similar device) can be used to remove undesired gas during casting, if needed.
4. A method for producing castings with HSMS or HGMS with solid-state transformation to HMOMS and HMSMS involves:
    a. Adding transforming solution to the mold/casting.
    b. A mold that contains either HSMS or HGMS.
        i. The HSMS or HGMS are placed in the mold prior to casting.
        ii. A method/device (consumable plug or similar device) can be used to keep the hollow spheres in place during casting.
        iii. A method/device (porous plug or similar device) can be used to remove and/or facilitate the escape of undesired gas during casting, if needed.
    c. Cooling the casting quickly to:
        i. Initially prevent conversion of the HSMS or HGMS to HMOMS or HMSMS, and solidify the transforming solution.
        ii. A temperature below the eutectic temperature. This is the heat soaking temperature (there can be more than one heat soaking temperature) at which:
            1. Either total or partial transformation of HSMS or HGMS to HMOMS or HMSMS takes place by chemical reaction and solid-state diffusion.
            2. The extent of transformation can be controlled by the choice of temperature and duration of the heat soak.
            3. Transformation can be slowed, occurring over a time frame of hours to centuries.
5. A method for producing billets with HSMS or HGMS with solid-state transformation to HMOMS and HMSMS involves:
    a. A mold or form contains either HSMS or HGMS, and a transformation powder
    b. The mold or form is:

i. Filled with hollow spheres and transformation powder.
   1. The mix of powder and hollow spheres can be pressed if needed.
   ii. Sealed under either vacuum or inert gas.
c. The mold or form is heated to the desired temperature to produce:
   i. Sintering of the transformation powder.
   ii. Transformation of the HSMS or HGMS to either HMOMS or HMSMS by chemical reaction with the transformation powder through:
      1. Solid-state diffusion.
      2. Transport of species through the gas phase surrounding the hollow spheres and transforming powder.
d. Holding the mold at temperature until the desired extent of sintering and transformation is achieved.
e. A method for holding the hollow spheres in place during sintering.
f. A method for removal or facilitating the escape of undesired gas during sintering and transformation of the hollow spheres.

6. A method for producing castings with HSMS or HGMS with mushy zone transformation involving:
   a. A mold contains either HSMS or HGMS.
   b. A method for keeping the hollow spheres in place during casting.
   c. A method for removal or facilitating the escape of undesired gas during casting, if needed.
   d. Addition/injection of transformation solution into the mold.
   e. Quickly cooling casting to:
      i. Initially prevent transforming the HSMS or HGMS to HMOMS or HMSMS.
      ii. A temperature below the eutectic temperature, producing a solid casting.
   f. Heating the casting to a temperature above the eutectic temperature, but below the fusion temperature of the transforming solution leading to:
      i. Formation of a mushy zone of liquid and solid around the HSMS or HGMS.
      ii. Transformation of HSMS or HGMS to HMOMS or HMSMS, or partial conversion.
   g. Quickly cooling the casting below the eutectic temperature, leaving a solid ring around the hollow sphere that consists of a transforming solid solution rich in silicon, compared to the rest of the transforming solid matrix in the composite.

7. A method for producing HMOMS or HMSMS as separate products involves:
   a. A reaction chamber with removable lid contains either HSMS or HGMS.
      i. HSMS or HGMS in the mold are converted to HMOMS or HMSMS during the casting process as per the physico-chemical processes presented in Exemplary Methods 1 and 2.
   b. A method/device for keeping the hollow spheres in place in the reaction chamber during addition of the transformation solution.
   c. A method to remove and/or facilitate the escape of undesired gas from the reaction chamber, if needed.
   d. The lid is removed after desired transformation of HSMS or HGMS to HMOMS or HMSMS is achieved.
      i. The HMOMS or the HMSMS, being buoyant, are removed to a tray using a rake, paddle, or similar device and allowed to cool.
      ii. Residual transforming solid solution coating the HMOMS or HMSMS is removed by chemical and physical means, if desired.
   e. Addition of transforming solution added to reaction chamber to increase ease of recovery of HMOMS and HMSMS.

8. A continuous process for producing a sheet material composite containing hollow spheres consisting of HSMS or HGMS or HMOMS or HMSMS (or any combination) involves:
   a. A layer of the hollow spheres placed on a conveyor belt, and the hollow spheres are:
      i. Dusted with a fixing powder or transforming powder that will eventually make up the matrix material surrounding the hollow spheres.
      ii. Lightly sprayed with a molten material that:
         1. Coats the hollow spheres and partially fuses the powdered material of Exemplary Method 8.a.i, thereby locking the hollow spheres in place.
   b. Exemplary Method 8.a.i and Exemplary Method 8.a.ii are repeated until the thickness of the porous composite is at the desirable thickness.
   c. The layered material in Exemplary Method 8.b passes through a guide block with a zone-melter.
      i. The layered material undergoes thickness reduction as it passes through the guide block with zone melter, but with minimal destruction of the hollow spheres.
      ii. The guide block is in contact with the material entering and leaving it, sealing the melt zone, and thereby:
         1. Keeping the hollow spheres in close-pack structure.
         2. Assuring uniformity in both vertical and horizontal directions of the solid composite sheet metal.

9. Hollow spheres (HSMS, HGMS, HMOMS, and HMSMS) can be used in 3-dimensional printing involving:
   a. Locking the hollow spheres in place by:
      i. Dusting with either a fixing powder or a transformation powder.
      ii. Lightly spraying with either molten fixing solution or molten transformation solution, thereby:
         1. Coating the hollow spheres and partially fusing either the fixing powder or the transformational powder.
      iii. Localized heating 10. More than one size of HSMS and/or HGMS can be used in combination in Exemplary Method 3, 4, 5, 6, 8, and 9 to increase the volume of hollow spheres in a composite.

11. A method for minimizing the impact of oxygen solubility in the transforming solution to minimize decomposition of silica in HSMS and HGMS involves:
   a. Adding in Exemplary Methods 3, 4, and 6, additional volume to molds, and reactors for the inclusion of sacrificial HSMS or HGMS to increase the oxygen content in the transformation solution.
   b. Addition of oxygen containing species (these can be solids, liquids, or gases) to the transforming solution and transforming powder in Exemplary Methods 3, 4, 5, 6, 7, 8, and 9.
   c. In sheet material composites, Exemplary Method 8, the loss of HSMS due to oxygen solubility can be offset by the mass of HSMS or HGMS contained in the preform prior to heat treatment.

I claim:

1. A method for producing hollow microspheres including a metal, said method comprising:

providing a mold;

providing hollow microspheres including silicon;

placing a consumable plug in an opening in a bottom of said mold below said provided hollow microspheres to keep said provided hollow microspheres in place in said mold;

placing said provided hollow microspheres in said mold;

providing transforming solution including metal atoms, said transforming solution including a molten metal; and reacting said transforming solution with said hollow microspheres to replace silicon atoms of the hollow microspheres with said metal atoms of said transforming solution to produce hollow microspheres including said metal, said step of reacting including introducing said transforming solution into said mold through said opening by consuming said consumable plug, thereby creating a mixture of said hollow microspheres and said molten metal, and controlling the temperature of the hollow microspheres and the transforming solution within a range sufficient to facilitate the replacement of silicon atoms in said walls of said hollow microspheres with said metal atoms of said transforming solution to produce hollow microspheres with walls including said metal atoms; and lowering the temperature of said hollow microspheres with walls including said metal atoms to solidify said transforming solution and form a casting including said produced hollow microspheres with walls including said metal atoms suspended in said solidified transforming solution.

2. The method of claim 1, wherein said provided hollow microspheres are hollow silica microspheres or hollow glass microspheres.

3. The method of claim 2, wherein said produced hollow microspheres with walls including metal atoms are hollow metal oxide microspheres or hollow metal silicate microspheres.

4. The method of claim 1, further comprising placing a porous plug in a top opening of said mold, said porous plug facilitating the escape of gas from said mold and preventing the escape of said provided hollow microspheres through said plug.

* * * * *